United States Patent [19]

Bass et al.

[11] 4,032,030

[45] June 28, 1977

[54] MODIFIABLE UTILITY OUTLET BOX COVER ELEMENT

[76] Inventors: David L. Bass, 2407 Lofurno Road, Chesapeake, Va. 23323; Kenneth B. Meador, 403 Anndora Road, Portsmouth, Va. 23701

[22] Filed: Dec. 23, 1976

[21] Appl. No.: 753,851

[52] U.S. Cl. .................................. 220/3.8; 174/57; 174/66; 220/241
[51] Int. Cl.² ........................................ H02G 3/14
[58] Field of Search .............. 220/3.2, 3.3, 3.4, 3.5, 220/3.6, 3.7, 3.8, 3.9, 3.92, 3.94, 62, 241, 242, 287; 229/43, 51 DB; 174/53–58, 66, 67

[56] References Cited

UNITED STATES PATENTS

| | | | |
|---|---|---|---|
| 1,952,719 | 3/1934 | Lewin | 220/3.8 |
| 1,961,728 | 6/1934 | Arnest et al. | 174/57 X |
| 2,863,935 | 12/1958 | Barina | 174/57 X |
| 2,983,399 | 5/1961 | Slater et al. | 220/3.8 X |
| 3,193,179 | 7/1965 | Bogren | 229/51 DB |
| 3,735,020 | 5/1973 | Licata | 174/66 |
| 3,955,701 | 5/1976 | Fisch | 174/57 X |
| 3,965,287 | 6/1976 | Mueller | 174/66 |

FOREIGN PATENTS OR APPLICATIONS

| | | | |
|---|---|---|---|
| 70,018 | 4/1915 | Austria | 220/287 |
| 991,301 | 6/1976 | Canada | 174/53 |
| 94,504 | 7/1969 | France | 220/287 |
| 810,280 | 9/1951 | Germany | 220/3.2 |

*Primary Examiner*—Stephen Marcus
*Attorney, Agent, or Firm*—J. Maxwell Carson, Jr.

[57] ABSTRACT

A modifiable utility outlet box cover element formed of thin, metallic sheet material useable without modification in a substantially square form in closing a substantially square utility outlet box including slots through which screws may be passed into engagement with screw receiving means carried by such utility outlet box. The four corner portions of such utility outlet box cover element, two of which include such slots, are readily separable from the remainder thereof along slots cut deeply into one of the surfaces of such utility outlet box cover element; such remainder of such utility outlet box cover element being shaped and proportioned to close octagonally shaped or round utility outlet boxes and including knock-out portions which, when readily separated from the remainder of such utility outlet box cover element, provide openings through which screws may be passed into engagement with screw receiving means carried by such octagonal or round utility outlet boxes.

2 Claims, 6 Drawing Figures

MODIFIABLE UTILITY OUTLET BOX COVER ELEMENT

This invention relates generally to a cover element for a utility outlet box, and more particularly to a cover element of this type readily modifiable for use with utility outlet boxes of more than one configuration.

Electricians engaged in the installation of the wiring in a building customarily provide therein a plurality of outlet boxes; particularly electrical outlet and junction boxes. Each of these utility outlet boxes are usually mounted in a building wall on a stud incorporated therein and, after the desired or required wiring has been introduced thereinto, are closed by a cover element connected thereto by conventional screw fasteners. In a single building, the use of both square and round or octagonal utility outlet boxes is a common practice, and a square cover element is customarily utilized with such a square utility outlet box while a round cover element is utilized with round or octagonal utility outlet boxes. Consequently, an electrician who has completed the wiring required in a particular utility outlet box may find that he does not have the proper cover element therefor readily available, and must leave the location thereof to obtain the proper cover element therefor, which could be a matter of considerable inconvenience if, for example, he has been working on high scaffolding at some distance from where a supply of such cover elements are kept. The present application, accordingly, is drawn to a utility outlet box cover element useable in obviating the problem inherent in the use of prior art utility outlet box cover elements, as hereinbefore set forth, and which provides advantages not heretofore obtainable.

Accordingly, an object of the present invention is the provision of a utility outlet box cover element modifiable for use with utility outlet boxes of different configurations.

Another object of the instant invention is the provision of a utility outlet box cover element useable without modification with utility outlet boxes of a particular configuration and modifiable for use with utility outlet boxes of other configurations.

According to the present invention, the foregoing and other objects are obtained bsy providing a utility outlet box cover element formed of relatively thin metallic sheet material initially of a substantially square shape proportioned for use in closing a substantially square utility outlet box; such initially substantially square utility outlet box cover element being conventionally provided with slots, apertures, or the like, through which conventional threaded fasteners may be passed into engagement with threaded fastener receiving means provided on such substantially square utility outlet boxes to secure such cover elements thereto. The corner portions of such initially substantially square utility outlet box cover element, two of which include such slots, apertures, or the like, are readily separable from the remainder thereof along slots relatively deeply cut into one of the surfaces thereof; such remainder of such utility outlet box cover element being proportioned to effectively close a conventional octagonally shaped utility outlet box as well as a conventional round utility outlet box of similar size. That portion of such utility outlet box cover element remaining after such corner portions have been separated therefrom includes areas defined by a circumscribing slot of a desired shape deeply cut into a surface thereof, or by an edge thereof in combination with a partially circumscribing slot of this nature, constituting portions thereof which may be readily knocked out or separated therefrom, to leave openings through which conventional threaded fasteners may be passed into engagement with threaded fastener receiving means provided on such octagonal or round utility outlet boxes to secure such a modified cover element thereto.

A more complete appreciation of the invention and many of the attendant advantages thereof will be readily apparent as the same becomes better understood by reference to the following detailed description when considered in connection with the accompanying drawing wherein.

Figure 1:
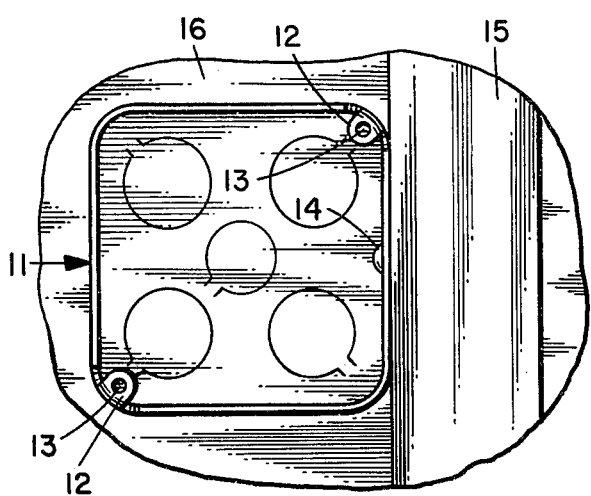
FIG. 1 is a front elevational view of a substantially square, conventional utility outlet box connected to a stud incorporated in a building wall prior to the introduction of wiring thereinto.

Referring now more particularly to the drawing, wherein like reference numerals designate the same or identical parts throughout the several views, and more specifically to FIG. 1, there is somewhat schematically shown a conventional, substantially square, utility outlet box formed of a suitable metallic material, generally designated by the reference numeral 11, conventionally provided with the tab elements 12 situated in diagonally opposed corners thereof, each of which includes an aperture 13 formed therethrough into which a conventional threaded fastener, such as a screw, may be rotatably driven. A conventional fastener 14, such as a screw, extends through an aperture formed in a side wall of such utility outlet box 11 and into a stud 15 incorporated in a building wall also incorporating the outer sheathing 16; such utility outlet box 11 thereby being firmly secured to such stud 15. The utility outlet box 11 shown in FIG. 1 is in readiness for an electrician to introduce the required wiring thereinto.

Figure 2:
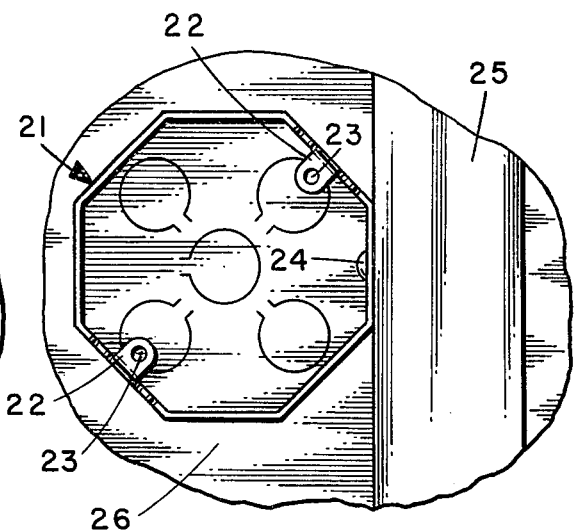
FIG. 2 is a front elevational view of an octagonal, conventional utility outlet box connected to a stud incorporated in a building wall prior to the introduction of wiring thereinto.

Referring now to FIG. 2 of the drawing, there is somewhat schematically shown a conventional, octagonal, utility outlet box formed of a suitable metallic material, generally designated by the reference numeral 21, conventionally provided with the tab elements 22 situated on opposed, parallelly disposed side walls thereof, each of which includes an aperture 23 formed therethrough into which a conventional threaded fastener, such as a screw, may be rotatably driven. A Conventional fastener 24, such as a screw, extends through an aperture formed in a side wall of such utility outlet box 21 and into a stud 25 incorporated in a building wall also incorporating the outer sheathing 26; such utility outlet box 21 thereby being firmly secured to such stud 25. The distance between the outer surfaces of any two of the opposed, parallelly extending, side walls of the utility outlet box 21 is substantially the same as the distance between any two of the opposed, parallelly extending, side walls of the utility outlet box 11. The utility outlet box 21 shown in FIG. 2 is in readiness for the introduction of the required wiring thereinto by an electrician.

Figure 3:
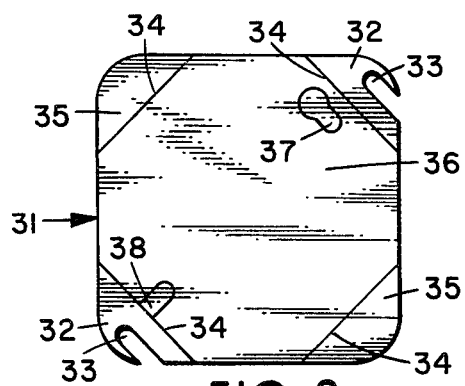
FIG. 3 is a front elevational view of a cover element useable without modification to close the utility outlet box shown in FIG. 1 and further useable after modification to close the utility outlet box shown in FIG. 2.
Figure 4:
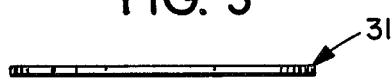
FIG. 4 is a view of the lower edge of the utility outlet box cover element depicted in FIG. 3.

Referring next to FIGS. 3 and 4 of the drawing, there is shown a cover element, generally designated by the reference numeral 31, useable in unmodified form to close the utility outlet box 11 and further useable in modified form to close the utility outlet box 21 as set forth hereinafter. The cover element 31, as shown in unmodified form in FIG. 3, corresponds in outline to the frontal configuration of the utility outlet box 11, and is formed of a suitable metallic material in sheet form as indicated in FIG. 4. The cover element 31 includes diagonally opposed corner portions 32, each of which is provided with a slot 33 extending thereinto from an edge of such cover element 31. Such slots 33 parallelly extend in the same direction from the closed ends thereof towards the open ends thereof, and the longitudinal centerlines thereof are spaced apart the same distance as the centers of the apertures 13 provided in the tab elements 12 of the utility outlet box 11. The circularly shaped inner ends of such slots 33 are in substantial alignment with the center of such cover element 31.

The corner portions 32 of the cover element 31 are readily separable from the remainder thereof along narrow slots 34 cut deeply into a surface of such cover element 31. The cover element 31 further includes diagonally opposed corner portions 35 likewise readily separable from the remainder thereof along the further narrow slots 34 similarly cut deeply into such surface of such cover element 31. An electrician desirous of separating the corner portions 32 and 35 from such cover element 31 need merely lay such cover element 31 flat upon a piece of board or the like with a corner portion 32 or 35 thereof extending over the edge of such board or the like and then strike such corner portion 32 or 35 of cover element 31 with a hammer to knock the same off of such cover element 31 and away therefrom; subsequently repeating such operation with respect to the other corner portions 32 and 35 thereof. When such corner portions 32 and 35 of the cover element 31 have been removed therefrom, the octagonally shaped remaining portion 36 thereof corresponds in outline to the frontal configuration of the utility box 21.

The portion 36 of the cover element 31 further includes a keyhole shaped area 37 defined by a circumscribing narrow slot cut deeply into a surface of such cover element 31, as well as a U-shaped area 38 defined by a partially circumscribing narrow slot cut deeply into such surface of such cover element 31 in combination with a narrow slot 34. The material encompassed by such areas 37 and 38 of the portion of cover element 31 may be readily separated therefrom by the application of a force thereagainst; for example, the sharp striking of the point of a heavy screwdriver thereagainst. The areas 37 and 38 of the portion 36 of cover element 31 are so positioned thereon, and are so shaped and sized, as to enable the portion 36 of cover plate 31 to be secured to the utility outlet box 21 to close the same, as more fully set forth hereinafter.

Figure 5:
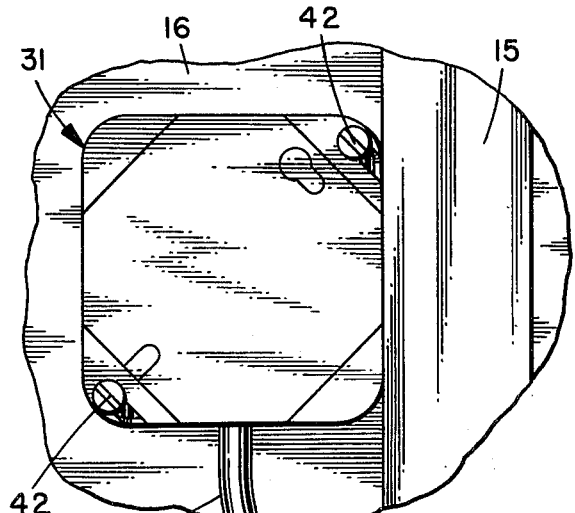
FIG. 5 is a front elevational view of the utility outlet box cover element interconnected in unmodified form with the utility outlet box shown in FIG. 1 after the introduction of wiring thereinto; and, FIG. 6 is a front elevational view of the utility outlet box cover element interconnected in modified form with the utility outlet box shown in FIG. 2 after the introduction of wiring thereinto.

Referring now to FIG. 5 of the drawing, the electrical cable 41 including a plurality of electrical conductors is shown extending into the utility outlet box 11 through an aperture conventionally provided in a side wall thereof. When such wiring has been introduced into such utility outlet box 11 and work thereon has been completed, which in the present case involves nothing more than the introduction of such wiring into such utility outlet box 11 where it will be available for future use, the cover element 31 is utilized to close such utility outlet box 11. As shown in FIG. 5, such cover element 31 in an unmodified form is congruently positioned against the front of the utility outlet box 11 and a screw 42 is passed through each of the slots 33 of such cover element 31 and into an aperture 13 of a tab element 12 of utility outlet box 11; each of such screws 42 then being screwed down into an aperture 13 to securely connect such cover element 31 to such utility outlet box 11 to close the same. When subsequent access to utility outlet box 11 is required, such screws 42 need not be entirely removed from engagement therewith, but merely loosened sufficiently for the cover element 31 to be slid away from such utility outlet box 11; the slots 33 thereof moving past the shank portions of such screws 42 to permit such separation of the cover element 31 and utility outlet box 11.

Figure 6:
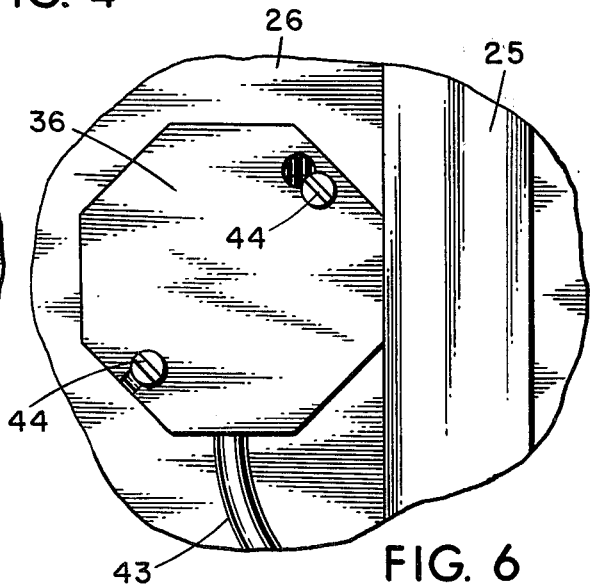

Turning now to FIG. 6 of the drawing, there is shown an electrical cable 43 including a plurality of conductors extending into the utility outlet box 21 through an aperture conventionally provided in a side wall thereof similarly to the introduction of the electrical cable 41 into the utility outlet box 11 and for a similar purpose. Thereafter, such cover element 31, modified as hereinbefore set forth by having the corner portions 32 and 35 removed therefrom and the material encompassed by the areas 37 and 38 removed from the portion 36 thereof, is congruently positioned against the front of the utility outlet box 21 as shown in FIG. 6, with a portion of the slot defined by the U-shaped area 38 thereof overlying the aperture 23 provided in a tab element 22 of utility outlet box 21, and with the small end portion of the aperture defined by the keyhole shaped area 37 thereof overlying the aperture 23 provided in the other tab element 22 of utility outlet box 21. A screw 44 is then passed through each of openings such in the portion 36 of cover element 31 and into each of such apertures 23; each of such screws 44 then being screwed down into an aperture 23 to securely connect such portion 36 of cover element 31 to such utility outlet box 21 to close the same. When subsequent access to such utility outlet box 21 is required, the complete removal of such screws 44 from engagement therewith is not necessary; the mere loosening of such screws 44 permitting such portion 36 of the cover element 31 to pivot about the screw 44 passing through the slot defined by the U-shaped area 38 thereof until the large end of the aperture defined by the keyhole shaped area 37, which is oriented to allow the same, can be lifted past the head of the adjacent screw 44, whereupon such portion 36 of cover element 31 may be slid away from the shank portion of the other of the screws 44, the sides of the slot which embrace the same sliding past the same towards the edge of such portion 36 of cover element 31.

It will now be apparent that the utility outlet box cover element herein disclosed, being useable with a variety of utility outlet boxes, and which may replace a variety of prior art cover elements for such utility outlet boxes, is effectively capable of obviating the problem hereinbefore outlined.

It will be further apparent that the narrow slots 34 formed in the cover element 31 may be of an arcuate configuration, if desired, so that when the corner portions thereof have been removed therefrom the remaining portion thereof will be substantially circular rather than octagonal. Such a circular remaining portion of the cover element 31 could be utilized in effectively closing either a round or an octagonal utility outlet box as well as the octagonal remaining portion 36 of the cover element 31 specifically disclosed herein.

Obviously, other variations and modifications of the present invention are possible in the light of the foregoing teachings. It is therefore to be understood that within the scope of the appended claims the invention may be practiced otherwise than as specifically described.

What is claimed as new and desired to be secured by Letters Patent of the United States is:

1. A modifiable cover element for a utility outlet box comprising a sheet of relatively thin material at least initially having an edge outline corresponding in size and shape to the frontal configuration of a first utility outlet box, said cover element having openings or the like formed therein through which screws may be passed into screw receiving means carried by said first utility outlet box when said cover element is congruently frontally positioned against said first utility outlet box for securing said cover element thereto, said cover element having slots cut into one of the surfaces thereof along which removable portions thereof may be readily broken away to leave a remaining portion thereof having an edge outline substantially corresponding in size and shape to the frontal configuration of a second utility outlet box, said remaining portion of said cover element including portions readily removable therefrom to define openings or the like therein through which screws may be passed into screw receiving means carried by said second utility outlet box when said remaining portion of said cover element is substantially congruently frontally positioned against said second utility outlet box for securing said remaining portion of said cover element thereto.

2. The modifiable cover element for a utility outlet box according to claim 1, wherein said initial edge outline thereof is substantially square, and wherein said remaining portion thereof after said removable portions thereof have been broken away therefrom has a substantially octagonal edge outline.

* * * * *